United States Patent
Sharma et al.

(10) Patent No.: US 6,862,288 B2
(45) Date of Patent: Mar. 1, 2005

(54) CIRCUIT REESTABLISHMENT AND TEAR DOWN IN A HIGHLY AVAILABLE COMMUNICATIONS SYSTEM

(75) Inventors: Shantnu Sharma, Acton, MA (US); Peter W. Bretschneider, Brookline, NH (US); Robert H. Constantin, Cambridge, MA (US); Mark A. W. Stewart, Belmont, MA (US); Sajin R. Valoth, Norwood, MA (US); Mashood Illikkal, Lowell, MA (US)

(73) Assignee: Fujitsu Network Communications, Inc., Richardson, TX (US)

( * ) Notice: Subject to any disclaimer, the term of this patent is extended or adjusted under 35 U.S.C. 154(b) by 760 days.

(21) Appl. No.: 09/761,144

(22) Filed: Jan. 16, 2001

(65) Prior Publication Data

US 2002/0093961 A1 Jul. 18, 2002

(51) Int. Cl.[7] .............................................. H04L 12/56
(52) U.S. Cl. ........................ 370/403; 370/248; 370/216
(58) Field of Search ................................ 370/403, 400, 370/401, 402, 404, 405, 410, 522, 442, 498, 229, 230, 248, 254, 255, 216, 217, 221, 222, 392

(56) References Cited

U.S. PATENT DOCUMENTS 6,130,889 A * 10/2000 Feldman et al. ............ 370/397
6,148,000 A * 11/2000 Feldman et al. ............ 370/397
6,243,387 B1 * 6/2001 Hjalmtysson et al. ....... 370/410
6,466,985 B1 * 10/2002 Goyal et al. ................ 709/238
2002/0181485 A1 * 12/2002 Cao et al. ................... 370/419

OTHER PUBLICATIONS

*Multiprotocol Label Switching Architecture*, Network Working Group, Inc., Eric C. Ross, Cisco Systems, Inc., Arun Viswanath, Force 10 Networks, Inc., Ross Call, Juniper Networks, Jul. 20, 2000, Internet Draft, pp. 1–90.

* cited by examiner

Primary Examiner—Brian Nguyen
(74) Attorney, Agent, or Firm—Weingarten, Schurgin, Gagnebin & Lebovici LLP

(57) ABSTRACT

A highly available communications system capable of circuit reestablishment and tear-down without manual intervention. The communications system includes a plurality of nodes interconnected by a plurality of communications paths to form at least one communications network. The nodes forward control packets on the network by way of a signaling protocol employing an out-of-band control technique. At least a portion of the nodes comprises a software configuration including a topology manager and a protocol manager. The protocol manager is operative to determine whether a control path is operational and whether a data transmission channel along a corresponding data path is established. In the event the control path is not operational, the protocol manager maintains the data transmission channel along the data path so long as the channel is established. The topology manager is operative to acquire network topology data, and the protocol manager is further operative to receive the topology data, deduce network topology changes therefrom, and reestablish and tear-down communications paths interconnecting the nodes based at least in part on the deduced topology changes.

13 Claims, 4 Drawing Sheets

CIRCUIT REESTABLISHMENT AND TEAR DOWN IN A HIGHLY AVAILABLE COMMUNICATIONS SYSTEM

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates generally to communications systems, and more specifically to a highly available communications system capable of circuit reestablishment and tear-down without manual intervention.

A conventional communications system includes a plurality of nodes interconnected by at least one communications circuit or path to form a network. For example, each node may comprise a computer system or some other device such as a router or switch. Each router included in the communications system is typically configured to forward communications packets to at least one neighboring node on the network by receiving a packet at one of its input ports, determining the destination address by examining information in the header field of the packet, and sending the packet to the appropriate output port. Each router typically forwards packets by way of "hop-to-hop" routing or explicit routing. In hop-to-hop routing, each router individually determines where to forward a packet based on the packet header information and topology information gathered by a routing protocol. In explicit routing, each router forwards packets along a previously established communications path that is indicated in the packet header field. Such paths are established by way of a signaling protocol that programs and maintains the communications paths interconnecting the plurality of network nodes. Control packets are sent by the signaling protocol to establish, modify, and tear-down data paths that are used to transmit data packets. For example, the signaling protocol may be a connection-oriented protocol such as the Constraint-based Routing Label Distribution Protocol (CR-LDP) or a connectionless protocol such as the Resource Reservation Protocol (RSVP-TE). Further, the signaling protocol may employ an in-band control technique, in which the control packets are sent between neighboring nodes along the same communications path as the data packets. Alternatively, the signaling protocol may employ an out-of-band control technique, in which the control packets and data packets are sent between the neighboring nodes along respective communications paths. In addition to forwarding packets, the router typically uses the signaling protocol to monitor the condition of the communications paths and the devices connected thereto. For example, the router may periodically send control packets comprising messages, e.g., "keep-alive" messages conforming to the CR-LDP protocol, to at least one device by way of a communications path to determine whether the communications path and/or the device connected thereto are functioning properly. The router typically starts at least one timer and waits for a response to the keep-alive message during a predetermined time interval of the timer. If an appropriate response to the keep-alive message is received at the router during the predetermined time interval, then it is concluded that the communications path and the device connected thereto are functioning properly.

One drawback of the conventional communications system is that when the router is monitoring the condition of the communications paths and neighboring devices, the router typically deprograms, i.e., "tears-down" the communications path if the appropriate response to the keep-alive message is not received before the timer expires. As a result, the transfer of data between the router and the device along the communications path stops. This may be acceptable for communications systems that employ in-band control techniques because if control packets such as responses to keep-alive messages cannot be received along a particular communications path, then data probably cannot be successfully transferred along that same communications path. However, such tearing-down of communications paths can be problematic for communications systems that employ out-of-band control techniques. For example, even though responses to keep-alive messages may not be receivable by way of the communications path handling the control packets, the communications path handling the data flow may still be capable of transferring data packets between the network nodes. Tearing-down such a viable data path is generally unacceptable in a highly available communications system. One approach to solving this problem is to configure the router's timer so that it never expires. However, this may result in dangling resources on the network if the control path between the router and the device is never reestablished. Moreover, some action on the part of an operator of the communications system may be required to rectify the resulting dangling resources problem.

It would therefore be desirable to have a highly available communications system that is capable of circuit reestablishment and tear-down without requiring manual intervention by an operator of the communications system.

BRIEF SUMMARY OF THE INVENTION

A highly available communications system is provided that is capable of circuit reestablishment and tear-down without manual intervention. The communications system includes a plurality of nodes interconnected by a plurality of communications circuits or paths to form at least one network. In a preferred embodiment, the network is a Multiple Protocol Label Switching based network having a ring topology for high bandwidth. The plurality of nodes includes at least one ingress node originating a communications path and at least one egress node terminating a communications path, and at least a portion of the plurality of nodes is configured to forward communications packets (e.g., control packets and data packets) to respective neighboring nodes on the network. The nodes may forward packets by way of "hop-to-hop" routing or explicit routing. The nodes forward control packets on the network by way of a signaling protocol employing an out-of-band control technique. Each node configured to forward packets is connected to at least one other node on the network by at least one control path and at least one data path. The data paths interconnecting the nodes transfer data packets between at least one source node and at least one destination node on the network, and the control paths transfer control packets between the nodes including messages for programming and maintaining the data paths. The signaling protocol may be a connection-oriented protocol or a connectionless protocol. In a preferred embodiment, the signaling protocol is the connectionless Resource Reservation Protocol.

At the top of the signaling software stack is a network management protocol such as the Simple Network Management Protocol that controls the flow of data to and from the layers in the stack below. The network management protocol interfaces with the application layer. This layer in turn interfaces with the central protocol manager, which comprises a routine at the next lower layer within the software stack. The central protocol manager interfaces with the routing topology manager, which comprises a routine in the same layer of the stack as the central protocol manager. The central protocol manager also interfaces with the signaling protocol in the layer directly below. This layer interfaces with the router's switching hardware, which in a preferred embodiment comprises an OC-192 data communications interface.

In a preferred embodiment, an instance of the central protocol manager is resident on each node. The central protocol manager is operative to monitor, establish/reestablish, modify, and tear-down communications paths interconnecting the network nodes. In a preferred embodiment, the central protocol manager running on a first node periodically sends a PATH message conforming to the Resource Reservation Protocol by way of the switching hardware to at least one second node along a communications path. If the central protocol manager running on the first node receives an RESV message in response to the PATH message from the second node before the expiration of a predetermined time interval, then it may be concluded that the communications path and the second node connected thereto are functioning properly. If the predetermined time interval expires before the RESV message is received at the first node, then the central protocol manager running on the first node determines whether a forwarding state defining a data transmission channel along the communications path between the first and second nodes is established. If the central protocol manager determines that the forwarding state along the communications path is not established, then the central protocol manager automatically tears-down the communications path. If the central protocol manager determines that the forwarding state along the communications path is established, then the central protocol manager does not tear-down the communications path.

In a preferred embodiment, an instance of the routing topology manager is also resident on each node. The routing topology manager is operative to acquire data relating to the topology of the network. In one embodiment, the routing topology manager acquires network topology data by sending suitable control messages to different parts of the network by way of the switching hardware, and receiving control messages including topology data in response thereto from at least one node. The topology data is transported through the signaling software stack to the central protocol manager, which uses the data to deduce changes in the network topology including a link failure (i.e., a fiber cut), a link restoration, a node failure, a node deletion, and a node addition. If the deduced change is a link failure, a link restoration, or a node failure, then no further action is taken. If the deduced change is a node deletion, then the central protocol manager determines by way of the topology data whether the node being deleted is an ingress node or an egress node, i.e., whether the deleted node originated or terminated any paths that include the node on which this instance of the central protocol manager is resident. In this case, the communications paths cannot be recovered and must be torn-down and their associated resources released. If the node being deleted is such an ingress node or an egress node, then the central protocol manager automatically tears-down the corresponding communications path. If the deduced change is a node deletion or a node addition, then the central protocol manager determines whether the node on which it is running is an ingress node, i.e., whether any paths previously traversed the deleted node or currently traverse the newly added node and originate on the node on which this instance of the central protocol manager is resident. If the central protocol manager determines that it is running on such an ingress node, then the central protocol manager automatically modifies the forwarding state defining the data transmission channel of the corresponding communications path according to the deduced topology changes. In a preferred embodiment, the central protocol manager automatically modifies the forwarding state of the communications path by sending a PATH message carrying an Explicit Route Object, which contains the modified explicit route that the PATH message is to follow. If the central protocol manager is not running on such an ingress node, then no further action is taken. Topology changes such as node additions and node deletions may therefore be detected and established and communications paths may be modified to incorporate such changes without necessitating the tear-down of data paths that are still viable despite those changes.

Other features, functions, and aspects of the invention will be evident from the Detailed Description of the Invention that follows.

BRIEF DESCRIPTION OF THE SEVERAL VIEWS OF THE DRAWING

The invention will be more fully understood with reference to the following Detailed Description of the Invention in conjunction with the drawings of which.

DETAILED DESCRIPTION OF THE INVENTION

Systems and methods are disclosed for performing circuit reestablishment and tear-down in a highly available communications network. Such circuit reestablishment and tear-down is performed without requiring manual intervention by an operator of the system.

Figure 1:
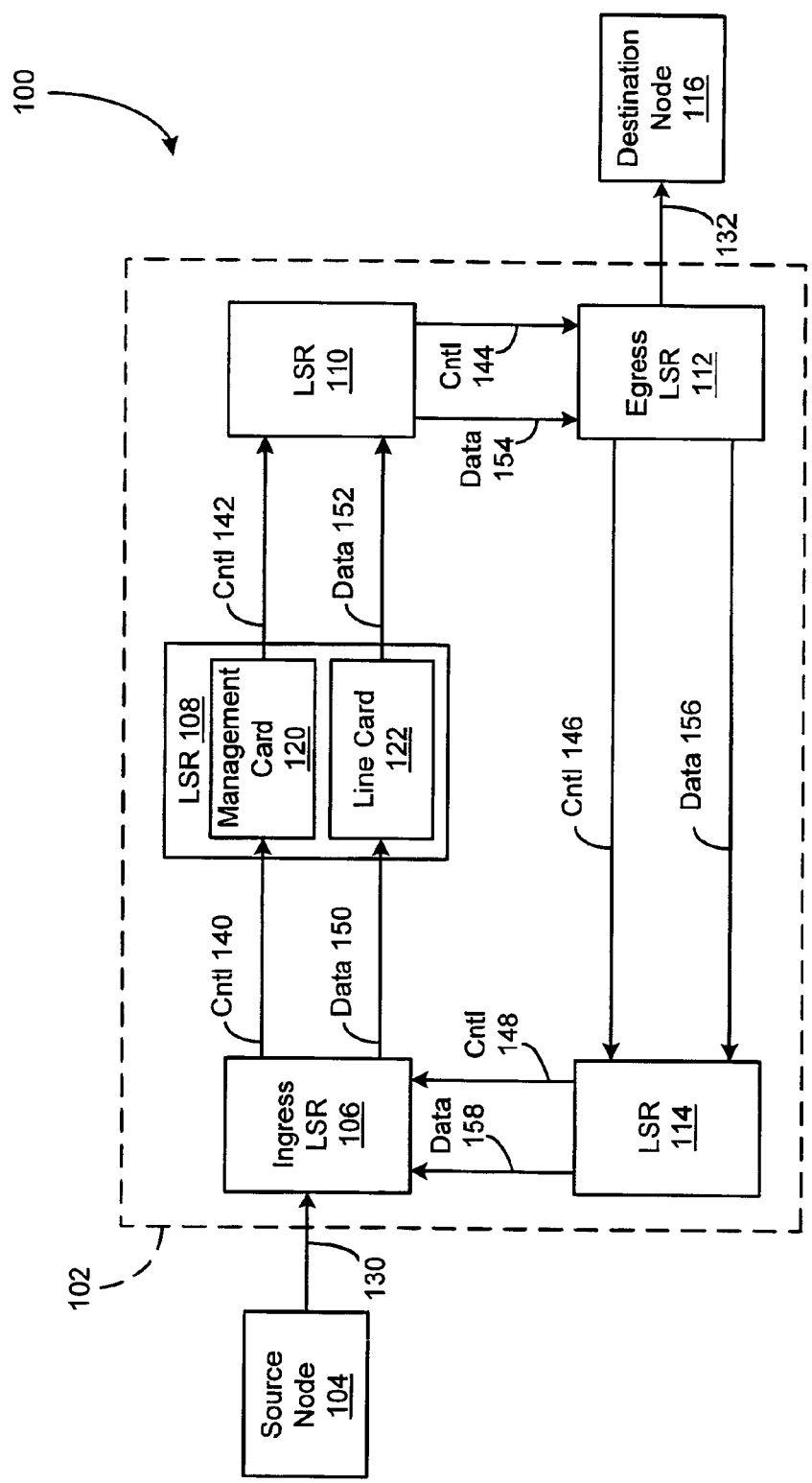
FIG. 1 is a block diagram depicting a communications system in accordance with the present invention, in which the system includes a communications network having separate control and data paths interconnecting nodes on the network.

FIG. 1 depicts an illustrative embodiment of a communications system 100 in accordance with the present invention. The communications system 100 includes a communications network 102 comprising a plurality of nodes interconnected by a plurality of communications circuits or paths, and at least one source node 104 and at least one destination node 116 coupled to the communications network 102. In a preferred embodiment, the communications network 102 is a Multiple Protocol Label Switching (MPLS) based network having a ring topology for high bandwidth, i.e., on the order of 10 Gbits/sec. The MPLS-based network 102 is configured to transfer at least one labeled communications packet from the source node 104 to the destination node 116 by way of a predetermined Label Switched Path (LSP). The MPLS-based network 102 includes a plurality of nodes 106, 108, 110, 112, and 114, in which each node preferably comprises a Label Switching Router (LSR) configured to implement label switching on the network 102. Specifically, the MPLS-based network 102 includes an ingress LSR 106 coupled to the source node 104 by way of a communications path 130, and an egress LSR 112 coupled to the destination node 116 by way of a communications path 132. It is noted that the ingress LSR 106 and the egress LSR 112 comprise respective edge LSR's. The architecture for MPLS is described in detail in Internet Draft draft-ietf-mpls-arch-07.txt July 2000, which is incorporated herein by reference.

Each of the LSR's 106, 108, 110, 112, and 114 is configured to forward packets (e.g., control packets and data packets) to a neighboring LSR on the network 102. For example, each LSR 106, 108, 110, 112, and 114 may forward packets by way of "hop-to-hop" routing or explicit routing. In hop-to-hop routing, each LSR 106, 108, 110, 112, and 114 determines where to forward a packet based on packet header information and network topology information. In explicit routing, each LSR 106, 108, 110, 112, and 114 forwards packets along an established communications path, as indicated in the packet header information. As mentioned above, the MPLS-based network preferably has a ring topology. Accordingly, the LSR's 106, 108, 110, 112, and 114 are depicted in FIG. 1 as being coupled to one another in the shape of a closed loop, in which each LSR is coupled to two (2) neighboring LSR's. In a preferred embodiment, each LSR 106, 108, 110, 112, and 114 forwards control packets to its neighboring LSR's by way of a signaling protocol employing an out-of-band control technique. The LSR's 106, 108, 110, 112, and 114 are therefore communicably coupled to their neighboring LSR's by at least one control path and at least one data path. Specifically, the ingress LSR 106 is communicably coupled to its neighboring LSR 108 by a control path 140 and a corresponding data path 150, the LSR 108 is communicably coupled to its neighboring LSR 110 by a control path 142 and a corresponding data path 152, the LSR 110 is communicably coupled to the egress LSR 112 by a control path 144 and a corresponding data path 154, the egress LSR 112 is communicably coupled to its neighboring LSR 114 by a control path 146 and a corresponding data path 156, and the LSR 114 is communicably coupled to the ingress LSR 106 by a control path 148 and a corresponding data path 158. Although the LSR's 106, 108, 110, 112, and 114 are configured to forward packets through the exemplary network 102 in a clockwise fashion, it should be understood that the communications system 100 may alternatively comprise counter-rotating networks.

In the illustrated embodiment, each LSR 106, 108, 110, 112, and 114 includes a protocol management card coupled to at least one control path and a line card coupled to at least one data path. For example, the LSR 108 includes a protocol management card 120 coupled between the control paths 140 and 142, and a line card 122 coupled between the corresponding data paths 150 and 152. In a preferred embodiment, the communications system 102 comprises an optical communications system. For example, each protocol management card may include a communications interface suitable for providing electrical and/or optical control signals to the control paths coupled thereto to program (i.e., establish/reestablish or modify), deprogram (i.e., "tear-down"), and otherwise maintain the corresponding data paths; and, each line card may include a communications interface suitable for providing high bandwidth optical data signals (e.g., Optical Carrier (OC) level 192) to the optical fiber data paths coupled thereto.

It is noted that each of the nodes 104, 106, 108, 110, 112, 114, and 116 included in the communications system 100 is typically a computerized device including at least one processor operative to execute programmed instructions out of an instruction memory, which may comprise a Random Access Memory (RAM) or a combination of RAM and Read Only Memory (ROM). Moreover, each device within the communications system 100 includes a communications interface suitable for coupling the respective device to the communications network 102. Specifically, the source node 104 includes a suitable communications interface (not shown) for coupling the source node 104 to the network 102 by way of the communications path 130. Similarly, the destination node 116 includes a suitable communications interface (not shown) for coupling the destination node 116 to the network 102 by way of the communications path 132.

Figure 2:
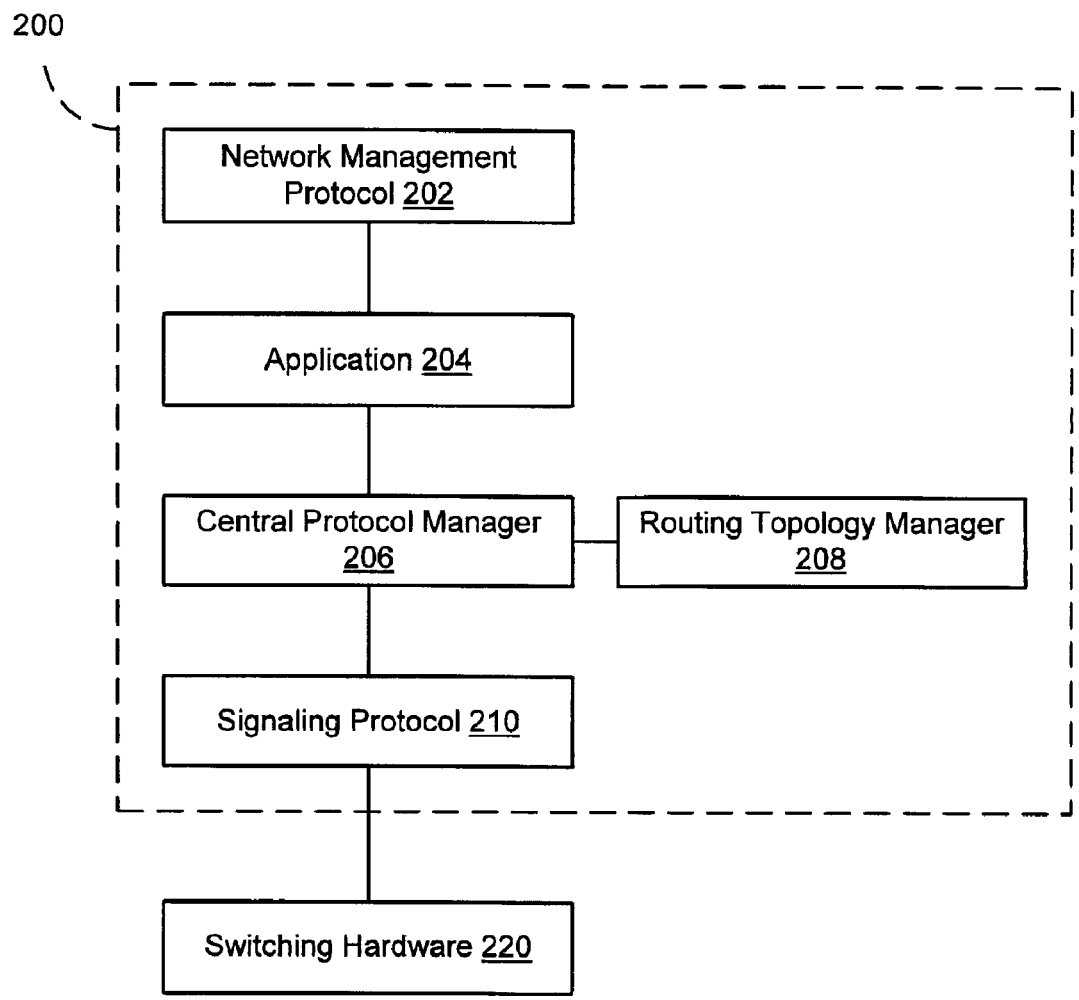
FIG. 2 is a block diagram depicting a signaling software stack employed by the nodes of the communications network of FIG. 1.

FIG. 2 depicts a conceptual representation of a signaling software stack 200 in accordance with the present invention. In a preferred embodiment, the signaling software stack 200 is resident in and executable out of at least one respective memory of each of the LSR's 106, 108, 110, 112, and 114 (see FIG. 1). At the top of the stack 200 is a network management protocol 202 such as the Simple Network Management Protocol (SNMP), which directs the flow of control messages to and from the layers in the stack below. The network management protocol 202 interfaces with an Application layer 204. This layer interfaces with a Central Protocol Manager 206, which comprises a routine at the next lower layer within the stack 200. The Central Protocol Manager 206 interfaces with a Routing Topology Manager 208, which comprises a routine that is preferably in the same layer of the stack 200 as the Central Protocol Manager 206. The Central Protocol Manager 206 also interfaces with a Signaling Protocol 210 in the layer directly below. Finally, this layer interfaces with the LSR's Switching Hardware 220, which may comprise the OC-192 data communications interface.

In the illustrated embodiment, the Routing Topology Manager 208 is operative to acquire data relating to the topology of the communications network 102, and to provide the topology data to the Central Protocol Manager 206. The Central Protocol Manager 206 is operative to send and receive control packets by way of the control paths including messages for monitoring, establishing, modifying, and tearing-down the corresponding data paths. For example, the Central Protocol Manager 206 may send control messages to determine whether a control path is in an operational state or a non-operational state, and whether a forwarding state defining a data transmission channel along a corresponding data path is established. The Central Protocol Manager 206 is further operative to receive the topology data from the Routing Topology Manager 208, deduce changes in the network topology therefrom, and suitably establish/modify/tear-down the data paths based on the deduced changes. The Signaling Protocol 210 may comprise the connection-oriented Constraint-based Routing Label Distribution Protocol (CR-LDP) or the connectionless Resource Reservation Protocol (RSVP-TE). In a preferred embodiment, the Signaling Protocol 210 comprises the RSVP-TE protocol.

It is understood that the communications network 102 may comprise a Local Area Network (LAN), a Wide Area Network (WAN), a global computer network such as the Internet, or any other network for communicatively coupling the respective network nodes. Further, the source node 104 and the destination node 116 may comprise a computer system or some other device such as a router or a switch. Such a computer system may take the form of a personal computer or workstation, a Personal Digital Assistant (PDA), an intelligent networked appliance, or a controller. Moreover, in alternative embodiments, the communications network 102 may comprise a non-MPLS-based network including a plurality of nodes suitably configured for performing the functions attributable to the respective devices described herein.

As described above, the communications network 102 (see FIG. 1) is preferably an MPLS-based network. For example, the source node 104 may provide at least one unlabeled packet to the ingress edge LSR 106, which applies a suitable label to the unlabeled packet. In one embodiment, the applied label is used to program the forwarding state of the packet over several hops through the communications network 102, e.g., from the ingress LSR 106 to the egress LSR 112. In an alternative embodiment, the applied label is used to program the forwarding state of the packet to the next hop LSR, e.g., from the ingress LSR 106 to the LSR 108. Specifically, each LSR 106, 108, 110, 112, and 114 maintains a respective label switching forwarding table including a plurality of entries. Each entry of the forwarding table is indexed by the label applied to an incoming packet and typically includes an outgoing label for the packet, an indication of an interface of the LSR to be used for forwarding the packet, and the address of the next hop LSR. Each LSR 106, 108, 110, 112, and 114 is configured to forward the packet through the MPLS-based network 102 by way of the Signaling Protocol 210 (see FIG. 2). It should be understood that the techniques of the presently disclosed communications system 100 are implemented by appropriately modifying the processing of the Signaling Protocol 210.

Those of ordinary skill in the art will appreciate that the RSVP-TE protocol can be used for reserving routing resources on a communications network to satisfy particular Quality of Service (QoS) requirements of the data flow. Further, the RSVP-TE protocol is typically a "soft state" protocol. This means that any reservation of resources on the network will typically expire after a predetermined time interval unless the reservation is periodically refreshed. LSR's on the network can refresh a reservation by sending PATH and RESV control messages conforming to the RSVP-TE protocol. In the conventional communications system, if the LSR's do not send the PATH and RESV messages to refresh the reservation before the predetermined time interval expires, then the LSR's tear-down the corresponding data path, e.g., by suitably modifying their respective label switching forwarding tables. The presently disclosed systems and methods may be used to prevent viable data paths from being inadvertently torn-down, and to reestablish data paths following changes in the topology of the communications network.

Figure 3:
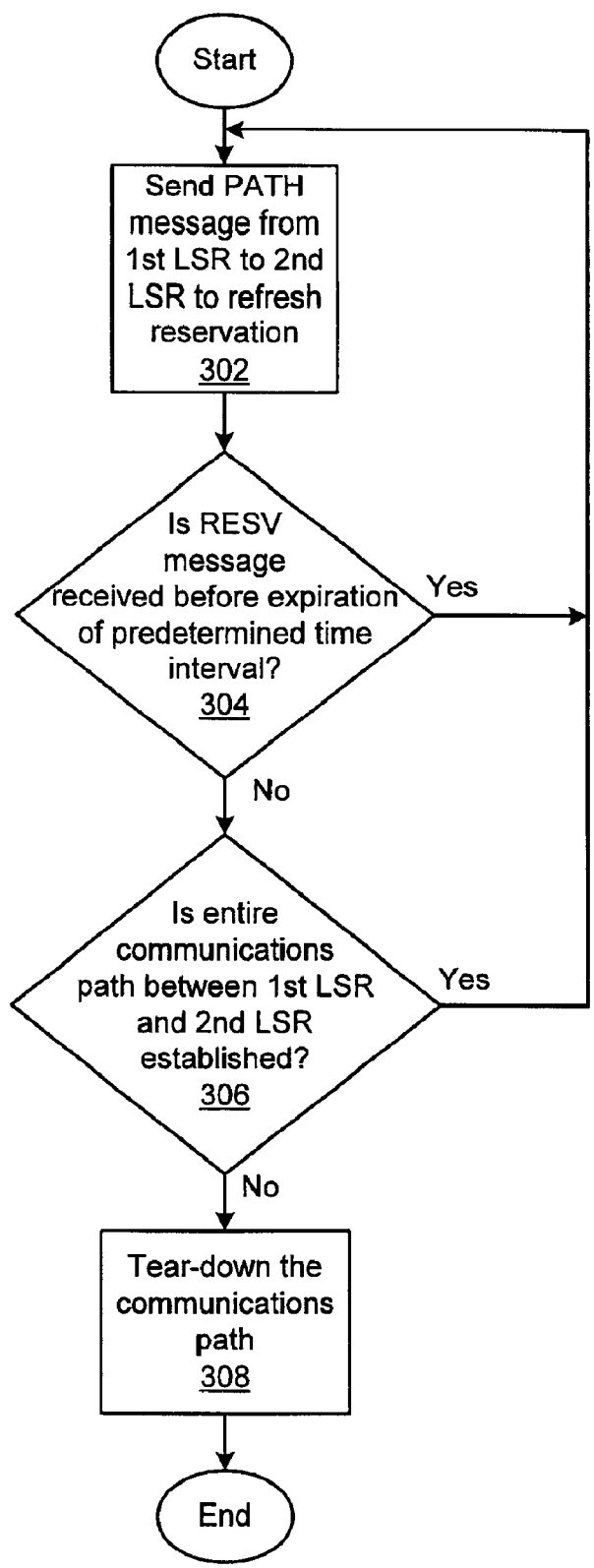
FIG. 3 is a flow diagram depicting a first method of programming and maintaining the communications paths of the communications network of FIG. 1.

A first method of programming and maintaining communications paths of a communications network according to the present invention is illustrated by reference to FIG. 3. In this first method, it is understood that the communications network is an MPLS-based network having a ring topology. As depicted in step 302, an instance of the Central Protocol Manager resident on a first LSR sends an out-of-band control message such as a PATH message to at least one second LSR to refresh a reservation along a particular LSP. Next, a determination is made, as depicted in step 304, as to whether the first LSR receives an RESV message from the second LSR in response to the PATH message before the expiration of a predetermined time interval. For example, the instance of the Central Protocol Manager resident on the first LSR may employ at least one state timer set to expire at the end of the predetermined time interval. In the event that the first LSR receives the RESV message from the second LSR before the state timer expires, the procedure loops back to step 302 to allow the Central Protocol Manager to reset the state timer and send subsequent PATH messages. In the event that the state timer expires before the first LSR receives the RESV message from the second LSR, a determination is made, as depicted in step 306, as to whether the entire communications path between the first and second LSR's is established. As described above, the communications path may be established by programming the forwarding state of at least one packet over the plurality of hops between the first and second LSR's. In the event that the entire communications path is established, the procedure again loops back to step 302. In the event that the entire communications path is not established, the Central Protocol Manager automatically tears-down, as depicted in step 308, the communications path. As described above, the communications path may be torn-down by suitably modifying the respective label switching forwarding tables maintained by the first and second LSR's and any LSR's therebetween. In accordance with this first method of programming and maintaining communications paths of a communications network, established communications paths are not inadvertently torn-down. This means that even if there is a failure in a control path between a source node and a destination node, the corresponding data path will not be torn-down so long as it is an established data path. As a result, the transfer of data between the source and destination nodes along the established data path is unimpeded.

Figure 4:
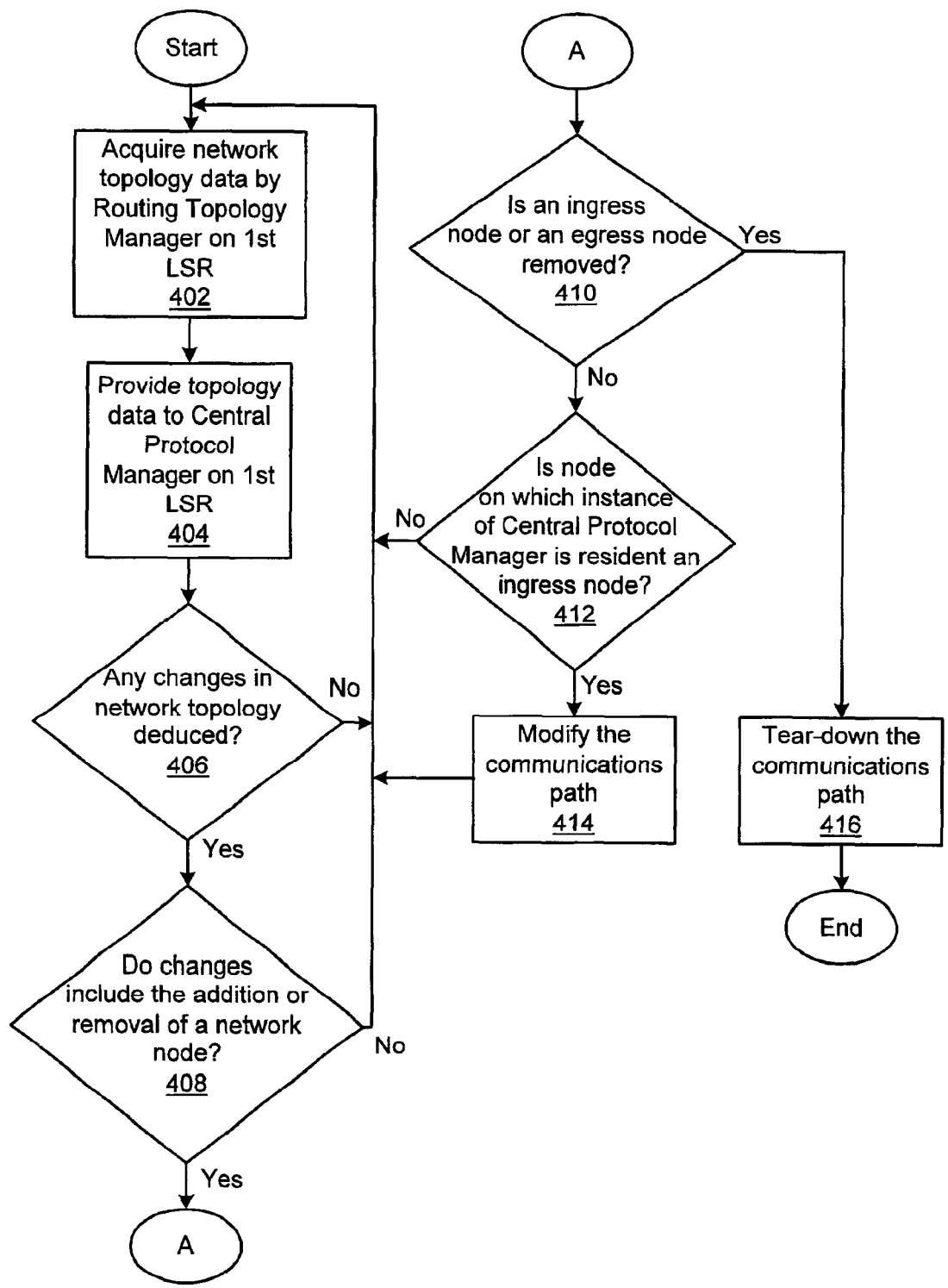
FIG. 4 is a flow diagram depicting a second method of programming and maintaining the communications paths of the communications network of FIG. 1.

A second method of programming and maintaining communications paths of a communications network according to the present invention is illustrated by reference to FIG. 4. In this second method, it is understood that the communications network is an MPLS-based network having a ring topology. As depicted in step 402, an instance of the Routing Topology Manager resident on a first LSR automatically acquires data relating to the topology of the communications network using any suitable technique. For example, the Routing Topology Manager may acquire network topology data by sending appropriate out-of-band control messages to at least one second LSR and receiving control messages including topology data in response thereto from the second LSR. As depicted in step 404, the Routing Topology Manager provides the topology data to the instance of the Central Protocol Manager resident on the first LSR, which uses the data to deduce any network topology changes. For example, the topology data may indicate a failure in the link (i.e., a fiber cut) between the first and second LSR's, a restoration of the link between the first and second LSR's, a failure of the second LSR, or a removal (deletion) of the second LSR. Moreover, the Routing Topology Manager may successively provide the Central Protocol Manager with topology data indicating, e.g., a viable link between the first and second LSR's, a subsequent failure of the link between the first and second LSR's, a link between the first LSR and a third LSR, and a link between the third LSR and the second LSR. The Central Protocol Manager provided with this topology data may then deduce that the third LSR was added between the first and second LSR's. Next, a determination is made, as depicted in step 406, as to whether the instance of the Central Protocol Manager resident on the first LSR has deduced any changes in the network topology. In the event that the Central Protocol Manager has not deduced any network topology changes, the procedure loops back to step 402 to allow the Routing Topology Manager to detect further changes in the network topology and provide subsequent topology data to the Central Protocol Manager. In the event that the Central Protocol Manager has deduced changes in the network topology, a determination is made, as depicted in step 408, as to whether the changes include the addition or removal of a network node between the first and second LSR's. In the event that the network topology changes do not include the addition or removal of a network node, the procedure again loops back to step 402. In the event that the network topology changes include the addition or removal of a network node, a determination is made, as depicted in step 410, as to whether an ingress node or an egress node has been removed, i.e., whether a node has been removed that originated or terminated the path including the first LSR on which this instance of the Central Protocol Manager is resident. In the event that such an ingress or egress node has been removed from the network, the Central Protocol Manager automatically tears-down, as depicted in step 416, the corresponding communications path. In the event that such an ingress or egress node has not been removed from the network, a determination is made, as depicted in step 412, as to whether the first LSR on which this instance of the Central Protocol Manager is resident comprises an ingress node, i.e., whether the first LSR originates the path that traversed a removed node or traverses an added node. In the event that the first LSR does not comprise such an ingress node, the procedure again loops back to step 402. In the event that the first LSR comprises such an ingress node, the Central Protocol Manager automatically modifies, as depicted in step 414, the communications path between the first and second LSR's. For example, the Central Protocol Manager may modify the forwarding state defining the data transmission channel of the communications path by sending a PATH message carrying an Explicit Route Object, which contains the modified explicit route the PATH message is to follow. In accordance with this second method of programming and maintaining communications paths of a communications network, communications paths in which an ingress node or an egress node is removed are torn-down. As a result, the removal of an ingress or egress node does not lead to dangling resources. Further, the instance of the Central Protocol Manager resident on an ingress node automatically modifies a communications path following the addition or removal of a network node. As a result, the data flow between source and destination nodes dynamically adapts to network topology changes without manual intervention of an operator of the system.

Although the above-described first and second methods are illustrated by reference to the separate flow diagrams of FIGS. 3 and 4, it should be understood that the control flow may jump from one method to the other. For example, in the event it is determined, as depicted in step 304 (see FIG. 3), that a RESV message is received before the expiration of a predetermined time interval, the control flow may jump to step 402 (see FIG. 4) to acquire network topology data. Similarly, in the event it is determined, as depicted in step 306 (see FIG. 3), that the entire communications path between the first and second LSR's is established, the control flow may jump to step 402 (see FIG. 4). Moreover, the control flow paths looping the control flow from steps 406, 408, and 412 back to step 402 (see FIG. 4) may alternatively cause the control flow to jump to step 302 to refresh the reservation along the LSP. It is understood that other variations of the control flow are possible.

It will further be appreciated by those of ordinary skill in the art that modifications to and variations of the above-described systems and methods may be made without departing from the inventive concepts disclosed herein. Accordingly, the invention should not be viewed as limited except as by the scope and spirit of the appended claims.

What is claimed is:

1. A method of operating a communications system, the communications system including a plurality of nodes interconnected by a plurality of communications paths to form at least one communications network, the plurality of communications paths including at least one control path for carrying out-of-band control information between at least two of the plurality of nodes and at least one corresponding data path for transferring data between the at least two nodes, the method comprising the steps of:

determining whether the control path is in an operational state or a non-operational state;

in the event the control path is in the non-operational state, determining whether a forwarding state defining a data transmission channel along the corresponding data path is established;

in the event the forwarding state defining the data transmission channel is not established, tearing-down the data transmission channel along the data path; and in the event the forwarding state defining the data transmission channel is established, maintaining the data transmission channel along the data path.

2. The method of claim 1 wherein the communications network has a ring topology.

3. The method of claim 1 wherein the first determining step comprises:

sending a first control message from a first node to a second node;

in the event a second control massage is not received at the first node from the second node, in response to the first control message before the expiration of a predetermined time interval, providing an indication that the control path is in the non-operational state; and in the event the second control message is received at the first node before the expiration of the predetermined time interval, providing an indication that the control path is in the operational state.

4. The method of claim 3 wherein the first control message and the second control message conform to messages within a predetermined protocol.

5. The method of claim 4 wherein the first control message and the second control message are operative to refresh a reservation along a label switched path between the first node and the second node.

6. A method of operating a communications system, the communications system including a plurality of nodes interconnected by a plurality of communications paths to form at least one communications network, the method comprising the steps of:

detecting at least one change in a topology of the communications network by a first node connected to at least one first communications path, the first node being operative to establish and to tear-down the at least one first communications path, the first node being further operative to acquire data relating to the topology of the communications network;

in the event the detected change includes the removal of a node determining whether the removed node comprises an ingress node or an egress node of the first communications path by the first node;

in the event the removed node comprises the ingress node or the egress node of the first communications path, tearing-down a data transmission channel along the first communications path between the ingress node and the egress node by the first node; and in the event the removed node does not comprise the ingress node or the egress node of the first communications path, maintaining the data transmission channel along the first communications path between the ingress node and the egress node.

7. The method of claim 6 wherein the communications network is a Multiple Protocol Label Switching based network.

8. The method of claim 7 wherein the tearing-down step comprises modifying a label switching forwarding table maintained by at least one node coupled to the first communications path.

9. A method of operating a communications system, the communications system including a plurality of nodes interconnected by a plurality of communications paths to form at least one communications network, the method comprising the steps of:

detecting at least one change in a topology of the communications network by a first node connected to at least one first communications path between an ingress node and an egress node, the first node being operative to establish and to tear-down the at least one first communications path, the first node being further operative to acquire data relating to the topology of the communications network;

in the event the detected change includes the addition of a node to the first communications path or the removal of a node from the first communications path, determining whether the first node comprises the ingress node of the first communications path; and in the event the first node comprises the ingress node of the first communications path, programming at least one of the nodes within the network to establish a data transmission channel from the ingress node to the egress node by the first node, wherein the data transmission channel is established subsequent to the detection of the network topology change.

10. The method of claim 9 wherein the communications network is a Multiple Protocol Label Switching based network.

11. The method of claim 10 wherein the programming step comprises programming a forwarding state of the data transmission channel along the first communications path.

12. A communications system, comprising:

a plurality of nodes; and a plurality of communications paths interconnecting the plurality of nodes to form at least one communications network, the plurality of communications paths including at least one control path for carrying out-of-band control information between at least two of the plurality of nodes and at least one corresponding data path for transferring data between the at least two nodes, wherein the at least two nodes comprise a software configuration including a protocol manager operative to determine whether the control path is in an operational state or a non-operational state, in the event the control path is in the non-operational state being further operative to determine whether a data transmission channel along the corresponding data path is established, in the event the data transmission channel is not established being further operative to tear-down the data transmission channel along the data path, and in the event the data transmission channel is established being further operative to maintain the data transmission channel along the data path.

13. The system of claim 12 wherein the communications network has a ring topology.

* * * * *

UNITED STATES PATENT AND TRADEMARK OFFICE
CERTIFICATE OF CORRECTION

PATENT NO. : 6,862,288 B2  Page 1 of 1
APPLICATION NO. : 09/761144
DATED : March 1, 2005
INVENTOR(S) : Shantnu Sharma et al.

It is certified that error appears in the above-identified patent and that said Letters Patent is hereby corrected as shown below:

Column 10, claim 3, line 34, "massage" should read --message--.

Signed and Sealed this

Twenty-sixth Day of December, 2006

JON W. DUDAS
*Director of the United States Patent and Trademark Office*